(No Model.)
R. MARSHALL.
FAN ATTACHMENT FOR ELEVATORS.
No. 316,633. Patented Apr. 28, 1885.
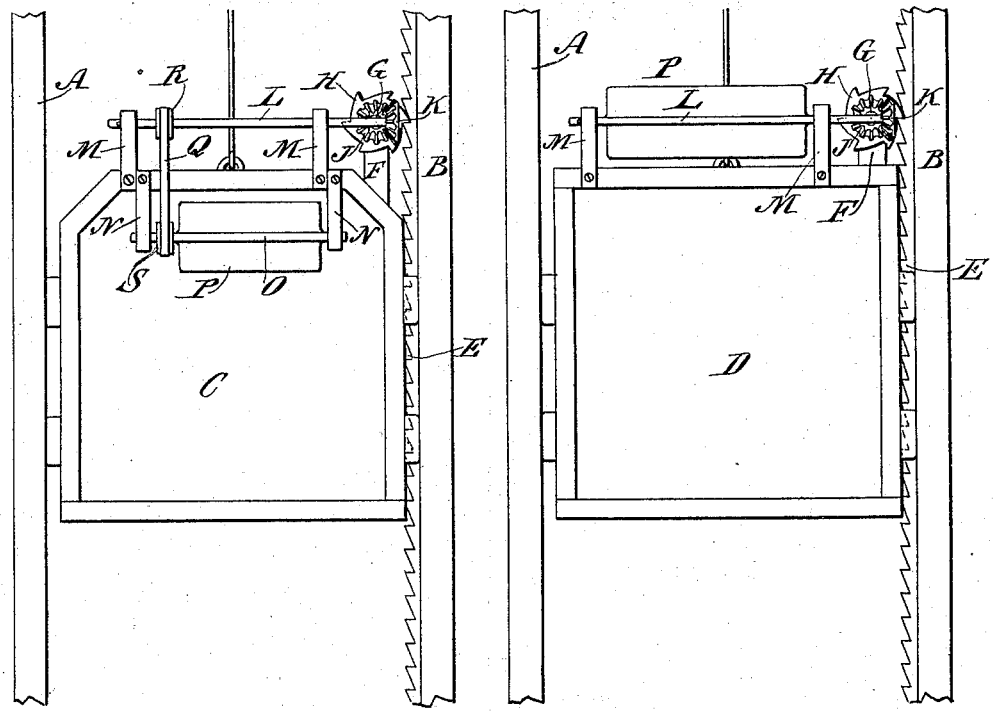
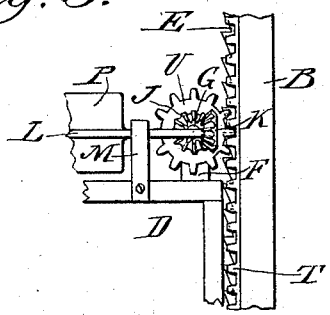
WITNESSES:
INVENTOR:
R. Marshall
BY Munn & Co.
ATTORNEYS.

United States Patent Office.

RICHARD MARSHALL, OF BROOKLYN, NEW YORK.

FAN ATTACHMENT FOR ELEVATORS.

SPECIFICATION forming part of Letters Patent No. 316,633, dated April 28, 1885.

Application filed March 19, 1885. (No model.)

*To all whom it may concern:*

Be it known that I, R. MARSHALL, of Brooklyn, in the county of Kings and State of New York, have invented a new and Improved Fan Attachment for Elevators, of which the following is a full, clear, and exact description.

The object of this invention is to provide a practical fan attachment for elevators; and the invention consists, principally, of suitable gearing arranged to be revolved by the up and down movement of the elevator-cage, combined with suitable means for transmitting the motion of the gearing to the fan arranged at the top of the cage.

The invention also consists of the construction, arrangement, and combination of parts, all as hereinafter described and claimed.

Reference is to be had to the accompanying drawings, forming part of this specification, in which similar letters of reference indicate corresponding parts in all the figures.

Figure 1 shows my invention applied to an ordinary passenger-elevator. Fig. 2 shows its application to a freight-elevator; and Fig. 3 is a detailed view showing a modification.

A B represent ordinary timbers in an elevator-well, and C represents an ordinary passenger-cage, while D represents an ordinary freight-elevator cage. The timbers B, Figs. 1 and 2, are provided with the ordinary safety-rack, E. To the upper surface of the cages I attach the post F, on a gudgeon, G, of which I journal the rag-wheel H. This runs in contact with the rack E, and consequently revolves as the cage is raised and lowered in the well.

Formed upon or secured to the rag-wheel H is the beveled gear-wheel J, which meshes with the beveled gear-wheel K on shaft L, journaled in the uprights M M, secured to the top of the cage.

In the arms N N, secured inside of the cage C, is journaled the fan-shaft O, to which the fan P is secured, and this shaft and fan are revolved from the shaft L by means of the belt Q, passing over the pulleys R S, secured, respectively, upon the shafts L and O, so that as the cage is raised and lowered in the well the fan P will be rapidly revolved to ventilate the cage and render it more comfortable for the passengers and attendant. With the freight-cage D, Fig. 2, the fan P is attached directly to the shaft L, so that in this form the shaft O, arms N, belt Q, and pulleys R S of Fig. 1 are dispensed with.

In the construction shown in Fig. 3 I employ a supplemental plain cog-rack, T, attached to the timber B, and with this, in place of a rag-wheel to run in contact with the rack E, I employ the plain cog-wheel U, that runs in contact with the plain rack T, as shown, to revolve shaft L through gear-wheels J K, as in Figs. 1 and 2.

Constructed as described, the fan attachment is very simple and practical, and may be applied to any elevator.

Having thus described my invention, what I claim as new, and desire to secure by Letters Patent, is—

1. The combination, with an elevator-cage, of a fan attached to the cage and connected with gearing, substantially as described, for revolving the fan as the cage is raised and lowered in the elevator-well, as set forth.

2. The fan P, journaled in the cage, in combination with shaft L, belt Q, and pulleys R S, and gear-wheels H, J, and K, the wheel H being arranged to run in contact with the rack E, substantially as and for the purposes set forth.

RICHARD MARSHALL.

Witnesses:
C. SEDGWICK,
EDWARD M. CLARK.